INVENTORS
EMIL J. SIMON AND EDWARD J. HEFELE
BY
ATTORNEY

May 4, 1943.　　E. J. SIMON ET AL　　2,318,338
RADIO DIRECTION FINDER
Filed June 2, 1938　　3 Sheets-Sheet 2
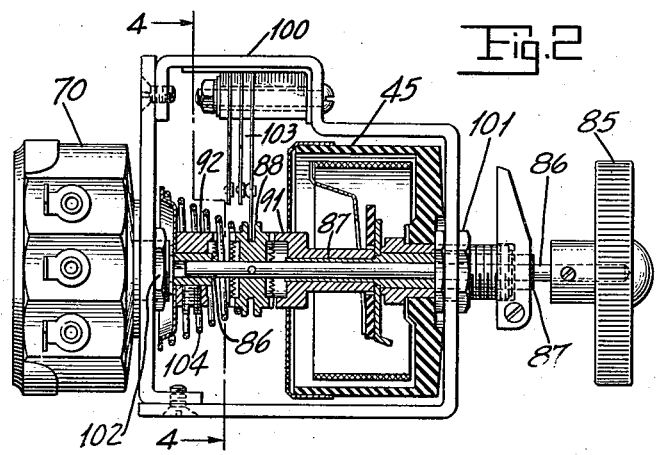
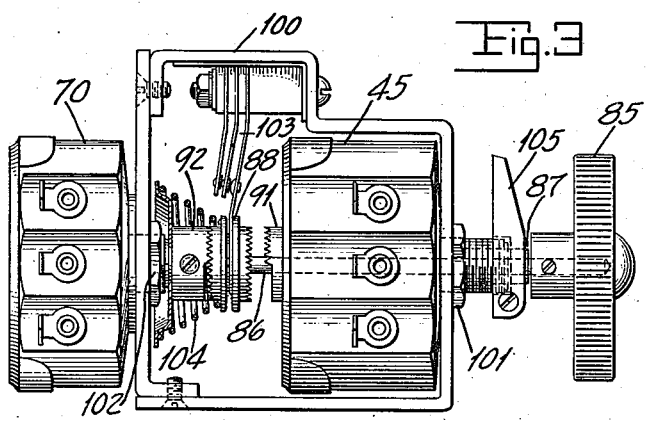
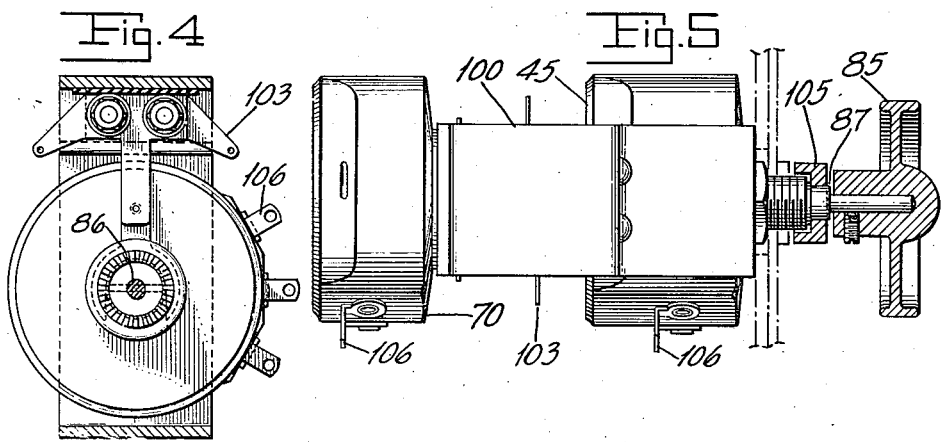
INVENTORS
EMIL J. SIMON AND EDWARD J. HEFELE
BY
ATTORNEY May 4, 1943.　　　E. J. SIMON ET AL　　　2,318,338
RADIO DIRECTION FINDER
Filed June 2, 1938　　　3 Sheets-Sheet 3
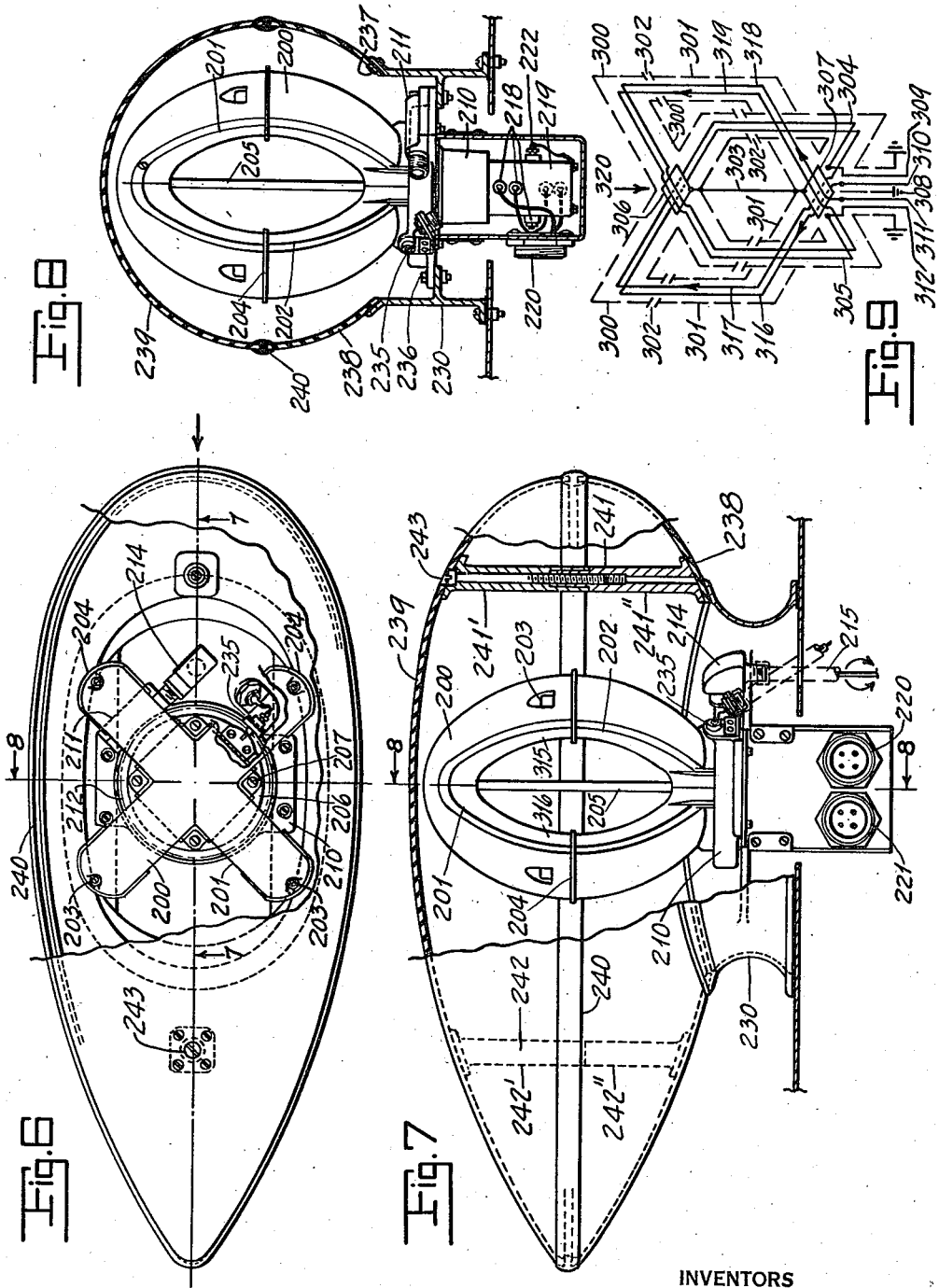
INVENTORS
EMIL J. SIMON AND EDWARD J. HEFELE
BY
ATTORNEY Patented May 4, 1943

2,318,338

UNITED STATES PATENT OFFICE 2,318,338

RADIO DIRECTION FINDER

Emil J. Simon, New York, and Edward J. Hefele, Amityville, N. Y., assignors to Radio Navigational Instrument Corporation, New York, N. Y., a corporation of New York Application June 2, 1938, Serial No. 211,338

17 Claims. (Cl. 250—11)

The present invention relates to improvements in radio direction finders and methods of operating the same, more particularly to direction finding apparatus of the type disclosed in previous patent applications Ser. No. 697,371 filed November 10, 1933 Patent No. 2,170,835, granted August 29, 1939, and Ser. No. 19,764 filed May 4, 1935, although not limited thereto.

The radio direction finder described in the aforementioned applications comprises substantially a pair of differently oriented relatively fixed and decoupled directional antennae such as loop aerials feeding into separate isolated receiving and amplifying channels of like overall sensitivity and operating a common output bearing meter such as a ratio measuring instrument the indications of which bear a predetermined relation to the direction of arrival of an electromagnetic wave received by said antennae with respect to a fixed zero or reference line such as the keel line or longitudinal axis of an aircraft or other vehicle. In order to insure reliable operation of a system of this character there are further provided means for checking and/or balancing the relative gain or sensitivity of the amplifying channels to maintain the ratio of the input potentials developed in the antennae by an incoming radio signal at the outputs of said channels and apply the outputs to the ratio measuring instrument.

Although the improvements disclosed in this application apply to and are advantageous in the radio guidance of aircraft, they are equally useful in connection with other types of direction finders used between fixed or mobile stations. The invention is also applicable to apparatus of the type disclosed in the aforementioned patent applications.

In the direction finding apparatus disclosed in the above mentioned applications, separate balance and sensitivity controls were employed. The use of separate controls made the operation unnecessarily burdensome for a busy pilot. Accordingly, an object of the present invention is to provide a novel control which combines both functions in a single unit.

It has been further observed that when approaching a radio transmitting station frequent reduction of sensitivity became necessary and repeated balancing was necessary.

Accordingly, another object of the invention is to reduce rebalancing operations to a minimum by providing a novel system of inter-connection between certain essential elements of each amplifier channel, thereby increasing the stability of balance without introducing reaction between the channels.

It was further found that where a flight is made over a distance of several hundred miles towards a radio station, large changes in field strength occur as the station is approached. Accordingly, a further object of the invention is to provide a novel type of automatic volume control for a double channel ratio meter type of direction finder which is entirely independent of the rotational position of the loops, and affording greater ease of operation with less supervision.

In instruments previously disclosed the two channels were balanced by varying the cathode bias of one or more amplifying tubes of one or both channels. Experience has shown that the effect of changing cathode bias is to slightly detune the particular tuned tube circuit involved. This is especially true in an intermediate frequency amplifier.

Accordingly, another object of the invention is to provide a novel method and means of attenuation and balance without affecting the resonant or other essential characteristics of the tuned amplifiers in each channel.

Another object of the invention is to provide a novel method and means for "sense" indication and for eliminating the 90° ambiguity inherent in direction finding systems of the aforementioned type.

Summed up, the objects of the invention are (1) to provide a novel method and means for varying the sensitivity of two amplifying channels manually or automatically without disturbing the balance; (2) to provide a new method of and means for balancing the channels without detuning the amplifiers; (3) to provide an automatic volume control system for a two-channel receiver connected to a pair of directional antennae which is independent of the directional position of the antennae and therefore does not introduce bearing errors; (4) to provide a positive and reliable system and method of "sense" operation by which false sense indications are eliminated; (5) to provide a novel combination of sensitivity and balance controls which will permit of quick control of both functions from one knob; (6) to provide for a joint rotation of electrostatically shielded directional antennae, such as a pair of crossed loop antennae, from a remote point for taking cross bearings and for other purposes as will appear more fully hereinafter; (7) to provide a substantially omni-directional audio frequency response by means of head-phones or the like independently of static disturbances caused by atmospheric precipitation such as rain or snow static, by utilizing a pair of differently oriented and electrostatically shielded loops in conjunction with a two-channel receiver; (8) to provide novel means for and method of eliminating the 90° ambiguity inherent in direction finding systems employing two loops and separate receiving channels; (9) to provide a loop structure comprising two coaxial loop windings mounted in a unitary metallically shielded frame, wherein the loops have equal physical and electrical dimensions and are neither electrostatically nor magnetically coupled to each other.

Figure 2 is a longitudinal cross-section showing in detail the mechanical construction of the preferred form of combined sensitivity and balance control. It is shown in the position for controlling sensitivity.

Figure 3 shows the device illustrated in Figure 2, but placed in the position to control balance and with the switch in position to connect the loops in series.

Figures 4 and 5 are top and end views, respectively, of the combined sensitivity and balance control shown in Figures 2 and 3.

Figure 6 is a top view of the coaxial rotatable loop structure and streamlined housing enclosing the same with the upper part of the housing removed.

Figure 7 is a longitudinal cross-section taken on line 7—7 of Figure 6.

Figure 8 is a cross-sectional view taken on line 8—8 of Figure 7.

Figure 9 is a schematic diagram of the shielded loop structure showing the details of the shielding necessary to prevent inter-coupling and to preserve electrical symmetry, and the method of winding, is also shown.

Like reference characters identify like parts in different views of the drawings.

Figure 1:
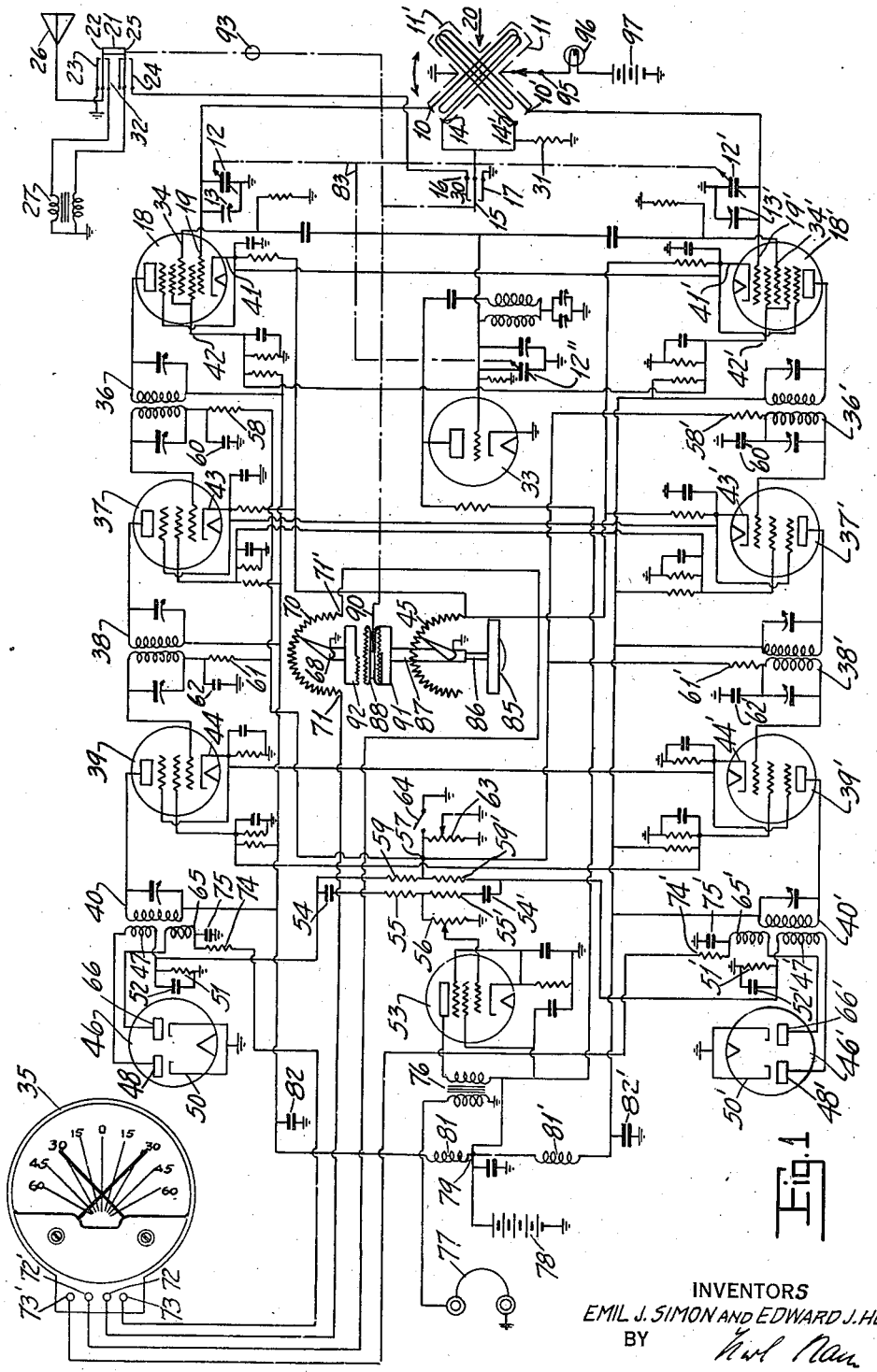
Figure 1 is a schematic wiring diagram of a preferred form of direction finding system embodying the improved constructional and operational features of the invention.

Referring more particularly to Figure 1, there are shown two coaxial loops 11 and 11' at right angles which are contained within a unitary electrostatically shielded structure hereafter described in detail. The high potential sides 10 and 10' of 11 and 11' connect to the tuning condensers 12 and 12'. In parallel with 12 and 12' are connected the trimming condensers 13 and 13' which are provided to permit of ready equalization of the minimum capacities of the two loop circuits. The low potential sides of 12 and 12' and also 13 and 13' connect to a common ground point on the receiver chassis.

The low potential sides of loops 11 and 11' connect to the center contact 15 of relay or switch 16. In normal operating condition the contacts 15 and 17 are engaged, connecting the low potential sides 14 and 14' of loops 11 and 11' directly to ground. Therefore, when the loop circuit is resonated to the frequency of an incoming signal, voltages developed across condensers 12 and 12' are impressed upon the control grids 19 and 19' of the mixer vacuum tubes 18 and 18'.

With an incoming signal coming from the direction indicated by the arrow 20, the loops are so polarized during manufacture that the voltages will add when they are placed in series. When the incoming signal direction indicated by the arrow 20 bisects the angle between the two loops, the voltage developed in both loops will be equal provided that the following factors are taken into account: First, the loops must have equal effective heights. To obtain equal effective heights the loops must have equal number of turns, equal areas and equal reduction in pickup by reason of the presence of the shielding. Second, the ratio of the reactance to resistance or the "Q" of the two loops must be identically equal. Third, the inductance of the two loops must be equal. Fourth, no electrostatic or electromagnetic coupling can exist between the two loops. Fifth, the combined capacities of the condensers 12 and 13 and 12' and 13' must be nearly identical. This becomes apparent in the design of the equipment in which a loop tuning capacity of 600 micro-microfarads is used. For manufacturing purposes it is necessary to specify a capacity tolerance of 0.4 micro-microfarad or 0.4% whichever is the greater. With loops of a normal "Q" of approximately 70, the capacity tolerance just mentioned has been found adequate to produce a bearing error of less than 1 degree.

When the sense switch 21 is in a position such that contacts 22 and 23 are engaged and contacts 24 and 25 are open, antenna 26 will be grounded and the secondary circuit of the transformer 27 through contacts 24 and 25 to contact 30 of switch 16 will be opened so that no voltage can be transferred from antenna 26 to contact 30 regardless of the position of switch 16. This is the normal operating position for the sense switch 21. The center arm 15 of switch 16 may now be brought in contact with contact 30 and no effect will be produced by antenna 26. However, contacts 15 and 17 are now no longer engaged, and resistor 31 is in series to ground with the low potential side of both loops. Resistor 31 is of the order of 10,000 ohms and has been so selected that it effectively permits the loops to be in series and at the same time provides bias for the control grids of mixer vacuum tubes 18 and 18'. As the loops are now effectively in series from a radio frequency standpoint, regardless of the position of the loops with respect to the incoming radio wave, equal voltages will be impressed on the control grids 19 and 19' of vacuum tubes 18 and 18' because capacities 12 and 13 and 12' and 13' are in series and identically equal and their central point is grouded. These equal voltages are now available for equalization of the sensitivities of both amplifier channels as described further on.

With contacts 15 and 17 of switch 16 engaged and the two loops grounded, rotation of the loops 11 and 11' from the position shown in Figure 1 through 360 degrees will produce four positions, 90 degrees apart, where equal voltages appear on the signal control grids of the vacuum tubes 18 and 18'. This condition introduces 90° and 180° bearing ambiguities which are readily resolved as described in the following. In the position indicated in Figure 1 the loops are so polarized that if placed in series their voltages will add. As they are rotated to a position which is 90 degrees away, the phase in one loop reverses because it has passed through the null position. Therefore, at the 90 degree position when the loops are placed in series, the voltages will neutralize and the resultant voltage impressed upon the grids of tubes 18 and 18' will be zero. Continuing the rotation to the 180 degree position, the second loop will now pass through its null position with respect to the incoming wave and the voltages will again add. Likewise, at the 270 degree position the voltages will again neutralize. With switch 21 in the normal position so that no voltage may be introduced into the loop circuit from antenna 26, and with switch 16 placed so that the loops are in series, it is apparent that a ready means is available for eliminating the ambiguity at the two 90 degree or beam bearing positions.

To eliminate the 180 degree ambiguity, the following circuit arrangement is made: Switch 21 is placed in a position so that contacts 24 and 25 are engaged and also contacts 22 and 32. Furthermore, switch 16 is placed in a position so that contacts 15 and 30 are engaged and contacts 15 and 17 open. Voltage will now be introduced from antenna 26 through transformer 27 into the loop circuits. When loops 11 and 11' are in series, as they are now, they act substantially as a single loop. Injection of voltage from antenna 26 of the proper phase and magnitude produces a heart shaped or cardioid polar diagram in both loops and provides ready means for eliminating the 180 degree ambiguity, because the cardioid in loop 11' is displaced 180° from the cardioid in loop 11. In one position of the coaxial loops, that is the dead ahead or zero bearing position, more voltage will appear on the grid of vacuum tube 18 and less will appear on the grid of vacuum tube 18'; while in the 180 degree or reciprocal bearing position, less voltage will appear on the grid of 18 and more voltage will appear on the grid of 18'. This will result in one channel becoming almost inoperative, and the other channel receiving approximately twice the normal signal voltage. The effect is indicated on the cross-pointer bearing meter to be described hereafter by a pronounced movement of the intersection of the pointers to left or right, depending on the "sense" of direction of the received signal.

The above is the ideal condition. However satisfactory "sense" indication is obtainable even when the voltage from antenna 26 is as little as one-third the loop voltage, or as large as twice the loop voltage.

The transformer 27 should preferably be wound on an iron dust core so that maximum tightness of coupling between the primary and secondary windings is secured. The primary of transformer 27 must be of such magnitude in inductance that it resonates together with the capacity of antenna 26 at a frequency which is higher or lower by approximately 10% than the lowest or highest frequency to which the direction finder can be tuned. The secondary of 27 consists of a few turns wound tightly on the dust core, and it should be designed to work into a resistance load of the order of 10 ohms.

Vacuum tube 33 in Figure 1 is the beat frequency oscillator tube. It, together with its associated circuit, produces oscillations which are of the proper frequency to beat with the signal produced on the grid of vacuum tubes 18 and 18' and produce the intermediate frequency to which the amplifier channels are pre-tuned. The voltage produced by vacuum tube 33 is introduced into the mixer tubes 18 and 18' through the injector grids 34 and 34' as can be seen on the wiring diagram. Vacuum tubes 18 and 18' are preferably of well known 6L7 type of "metal" tubes.

The intermediate frequency amplifier channels consist each of two double tuned transformer coupled stages which feed into special diode transformers, and rectifier circuits. If the functions which this instrument is to perform are to be fully carried out, certain special requirements for the intermediate frequency amplifier channel must be met. First, the relationship between the input voltage to the grids of mixer vacuum tubes 18 and 18' and the output current supplied to the elements of the indicating meter must be linear. Second, the amplification obtained in both channels must be made equal. Third, variations in the sensitivity control resistance must not affect the equality of gain between the two channels to a great degree because the operation of rebalancing the instrument will then become burdensome. Fourth, no intercoupling or transfer of voltage may exist between channels, without introducing bearing errors. Fifth, in modern high speed aircraft automatic volume control is necessary. Over extended periods of flight repeated adjustment of the manual sensitivity control becomes necessary and burdensome unless automatic volume control is provided. Sixth, previously with this instrument it was necessary to adjust the sensitivity control and the balance control separately. A new and improved control which contains in a single unit comprising both the balance and sensitivity controls is shown in Figures 2 to 5.

Referring again to Figure 1, the signal is impressed on the grids of vacuum tubes 18 and 18' where it is mixed with the oscillations from oscillator tube 33 to produce the intermediate frequency. Signals appearing in the plate circuit of mixers 18 and 18', are impressed upon the transformers 36 and 36'. They are further amplified by vacuum tubes 37 and 37' which are preferably type 6K7. The signals travel on through the train, that is, through transformers 38 and 38' and vacuum tubes 39 and 39' until they reach the special diode transformers 40 and 40' respectively.

The direct current voltages applied to the electrodes of the vacuum tubes 18 and 18', 37 and 37', 39 and 39', are those recommended by the tube manufacturer. The use of recommended voltages produces linear amplification. The cathodes 41 and 41' of vacuum tubes 18 and 18' are inter-connected. Likewise the screens of 42 and 42' are inter-connected. Inspection of vacuum tubes 37 and 37', and 39 and 39' will also show the cathodes and screens inter-connected. This inter-connection has been found advantageous if the change in sensitivity control setting is not to affect the relative amplification of the amplifiers with respect to each other. No inter-coupling between channels is introduced by these cross-connections because the cross-connections are made between points which are substantially at radio frequency ground potential. Moreover, the relative sensitivities of the two channels are maintained more nearly equal because the direct current potentials on cathodes 41, 43 and 44, are maintained exactly equal to the potentials on the equivalent tubes in the other channel. It has been found that without this cross-connection, due to differences in tube characteristics, changes in the sensitivity control setting will produce unequal voltages on the control electrodes. The manual sensitivity control is obtained by varying resistor 45 which is in the common cathode circuit of vacuum tubes 18 and 18' and 37 and 37'. Vacuum tubes 39 and 39' are not controlled because it has been found that when these tubes are run at fixed cathode bias the balance is maintained more effectively with large changes in the sensitivity control setting.

Diode transformers 40 and 40' are of special design and have each a secondary and a tertiary winding. Vacuum tubes 46 and 46' are preferably type 6H6 twin diode rectifier tubes. Secondary windings 47 and 47' of diode transformers 40 and 40' connect to the diode plates 48 and 48' and the circuit is completed, respectively, through the cathodes 50 and 50' to ground, back through resistors 51 and 51' to the other side, of the secondary windings 47 and 47'. Resistors 51 and 51' are in the order of ½ megohm, and the secondary windings 47 and 47' must be designed to work into a load of that resistance. Capacities 52 and 52' by-pass resistors 51 and 51' for R. F. voltages. However, capacities 52 and 52' must not be made of too large a magnitude because the audio voltage used for producing audio frequency signals on the grid of vacuum tube 53 exists across resistors 51 and 51'. The direct current voltage produced by rectification of the intermediate frequency voltage across resistors 51 and 51' are used for automatic volume control of vacuum tubes 37 and 37' and 39 and 39'. The audio frequency voltages existing across resistors 51 and 51' are applied to the control grid of tube 53 through coupling condensers 54 and 54', and resistors 55 and 55' to resistor 56 which is the audio volume control. Resistors 55 and 55' prevent intermediate frequency intercoupling. Variation of the position of the contact on resistor 56 permits of variation of the audio frequency voltage applied to the grid of the power amplifier pentode 53. When equal voltages are applied from transformers 40 and 40' corresponding to a condition when the loop is on the dead ahead bearing each channel contributes equally to the audio voltage input to vacuum tube 53. When the bisector of the angle between the two loops happens to be 45 degrees off the dead ahead bearing, one loop will be at a null position for the incoming signal. Therefore, voltage will appear across only one resistor either 51 or 51' depending on which loop happens to be on the null. In this condition approximately 0.7 of the audio voltage is applied by the channel which is receiving signals, so that at all times omni-directional aural reception is available and is independent of the loop structure's rotational position.

The direct current voltages appearing across resistors 51 and 51' are further used for automatic volume control. For this purpose the negative sides of resistors 51 and 51' are connected to resistors 59 and 59' respectively as shown in Figure 1.

When the incoming signal comes from a direction which bisects the angle between the loops, equal direct current voltages will appear across the resistors 51 and 51'. This voltage will appear at point 57 which is the junction of all the leads conducting the automatic volume control voltage to the various tubes.

When the signal is coming in from any other angle than that which bisects the angle between the loops, different voltages will be developed across resistors 51 and 51', but the automatic volume control voltage appearing at point 57 will always be a voltage which is greater than one half of the individual voltages. In practice, in the actual instrument itself, point 57 has a voltage which does not vary more than in the ratio of 1 to 1.4 regardless of the position of the loops with respect to the incoming signal. Therefore point 57 which is the junction of all the leads conducting the automatic volume control voltage to vacuum tubes 37, 37', 39 and 39' will have a voltage which will not vary more than the ratio of 1 to 1.4 regardless of the position of the loops with respect to the incoming signal.

This voltage is applied from point 57 to the grids of vacuum tubes 37 and 37' through radio frequency decoupling resistors 58 and 58'. By-pass condensers 60 and 60' provide a return for radio frequency currents to ground from the secondary of transformers 36 and 36'. In the same manner, de-coupling resistors 61 and 61' apply the control voltage to vacuum tubes 39 and 39'. By-pass condensers 62 and 62' provide the necessary ground return for the radio frequency current in the secondary of transformers 38 and 38'. Resistors 59 and 59' are of a value in the order of several megohms. This is possible because the load resistance through which the automatic volume control voltage is being applied is of a very large magnitude. By having large magnitudes for resistors 59 and 59' inter-coupling between diode circuits in the opposite channels is eliminated. Also connected to point 57 is resistor 63 and switch 64. Resistor 63 is a volume control resistor of several megohms. Adjustment of this resistor permits variation of the amount of automatic volume control action. Switch 64 is provided to cut out the automatic volume control voltages and to leave the manual control alone operative. It has been found when using automatic volume control that the change in balance with change in sensitivity is greatly minimized because of the fact that all cathodes are maintained at a fixed bias with respect to ground.

Tertiary windings 65 and 65' of diode transformers 40 and 40' operate the other diodes of the preferred twin diode rectifiers 6H6. The circuit may be traced through as follows: The high potential sides of the tertiary windings 65 and 65' connect to the plates 66 and 66'. The cathodes are connected to ground as indicated on the diagram. Continuing from the cathodes through the ground path of the receiver chassis we arrive at points 68 of resistor 70 which is the balance control resistor. Point 71' which is one end of the balance control resistor is connected to point 72' of the ratio meter 35. Point 71 at the other end of the balance control resistor is connected to point 72 on the ratio meter. The current passing through point 72 on the ratio meter passes through the right hand meter element back to point 73. From there point 73 connects to the resistor 74 which is in the order of 50,000 ohms. The other side of resistor 74 connects back to the tertiary winding 65. Condenser 75 by-passes the radio frequency current to cathode from the tertiary winding 65. Condenser 75 can be of a relatively large value, the larger the better.

Likewise, the same circuit can be traced for the channel containing diode tube 46' which connects to the left hand meter element. Resistor 74 should be of at least the value specified in order to preserve linear response from the diode rectifier 46. Meter 35 preferably is a special crossed pointer type of ratio meter containing two separate meter elements and having a sensitivity for full scale deflection of approximately 100 microamperes. The meter will be described in greater detail when the overall operation of the equipment is described.

The audio frequency voltage applied to the grid of vacuum tube 53 is amplified and appears in the plate circuit where it is impressed upon the audio output transformer 76. A pair of telephones 77 is connected to the secondary circuit as shown and provides for omni-directional aural reception.

The power supply for heating the cathodes can be any of the well-known sources. The plate supply for the various tubes is shown as the B battery, 78. The cathode heater circuits have been omitted because they are well known in the art. The plate supply is connected as follows: From point 79 which is the common junction of the plate supply to both channels and to the audio and oscillator tubes, through radio frequency chokes 81 and 81' by-passed by condensers 82 and 82' to vacuum tubes 39 and 39', vacuum tubes 37 and 37' and vacuum tubes 36 and 36'. The radio frequency chokes 81 and 81' may or may not be necessary and depend upon the particular construction being used for the instrument. Their function as shown in the diagram is to recouple one channel from the other as a result of using a common plate supply.

No attempt has been made to describe any of the functions of parts which are obviously well-known in the art or which have been described in the two copending applications above referred to.

The improved system hereinbefore described operates as follows:

Loops 11 and 11' are polarized at the time of manufacture so that when set up in the position indicated in Figure 1, their voltages will add when a signal arrives from the direction indicated by arrow 20. The desired signal is tuned in by means of the condensers 12 and 12' and the oscillator condenser 12''. These condensers are operated by a common control indicated by the dotted line 13. After the station is tuned in, the signal voltage appears on the grids of the mixer tubes 18 and 18'. The voltage on the grids of 18 and 18' will be equal if the precautions mentioned for the loop circuit design have been taken and the signal is coming from a direction which is the bisector of the angle between loops 11 and 11'. The voltage is amplified by the intermediate frequency amplifier train in each channel and appears in the output circuit as a meter indication and if modulated signals are being received as an audio frequency signal in the telephones 77. The meter pointers will rise and may go off scale. To adjust the meter deflection, the sensitivity control 45 of suitable resistance, which is operated by the knob 85, is adjusted. The knob 85 is fastened to the shaft 86 which in turn passes through the hollow shaft 87. The other end of shaft 86 ends in a double faced dog clutch 88 which is held tightly engaged by means of a spring 90 against the teeth of the clutch face 91. Rotation of the knob 85 without depressing it, will cause the sensitivity control resistor 45 to vary in value, varying the bias on the controlled vacuum tubes in both channels simultaneously and in the same direction. The meter pointer deflection is then adjusted to the correct value, that is approximately two thirds full scale deflection. When the control knob 85 is depressed, the intersection of the pointers may, or may not, occur on the zero degree line. If it does not occur on the zero degree line, the gains of the two amplifier channels are not equal. This is true because when the knob 85 is depressed, the loops are connected in series as more fully hereinafter described, and equal voltages will be applied to the grids of mixer tubes 18 and 18'. To equalize the gain of the two amplifier channels with respect to each other, control knob 85 is kept pressed, disengaging the double faced clutch 88 from clutch 91, and engaging clutch 92. Sensitivity control resistor 45 can now no longer be operated by the control knob 85 but balance control resistor 70 having a total resistance of about 50,000 ohms is now operable by rotating knob 85. The balance control resistor as previously described has two branches, each in series with one element of the meter. Changing the position of the contactor on resistor 70 will insert varying values of this resistance differentially in the diode meter circuits of both channels. Thus, it is possible to equalize the overall sensitivities of the channels (insofar as the meter indication is concerned), by adjusting the meter intersection until it is on the zero line.

It was assumed that the loops were in the correct position, that is, where the incoming signal bisects the angle between the loops to produce equal voltages on the grids of mixer tubes 18 and 18'. Mechanically interlinked with spring 90 on the dual balance sensitivity control, is the center contact 15 of switch 16. The normal position of switch 16 when knob 85 is not depressed, is for contact 15 to engage contact 17 thereby grounding the loops. However, when depressing knob 85 and actuating switch 15, the loops as previously described, are placed in series, guaranteeing equal voltages on grids 18 and 18' for the purpose of balancing regardless of the direction from which the incoming signal arrives.

As the loops are rotated through 360° with the low potential side of 11 and 11' grounded, four zero bearing positions, 90° apart will occur on the meter 35. With the sense switch 21 in the position so that no voltage will be introduced in the center of the loop, when switch 16 is operated so that contacts 15 and 17 are not engaged, the 90° and 270° positions of the loops will develop no voltage and the meter pointers will drop abruptly on depressing the balance control eliminating all doubt as to whether the bearing is coming from ahead or astern, or from one of the beams.

There still exists the doubt as to whether the radio wave is coming from ahead or astern. To eliminate this ambiguity the sense switch control knob 93 is depressed. Control knob 93 is mechanically interlocked with switch 21 and switch 16 so that voltage may be applied from antenna 26 through the sense transformer 27 to the center point of the loops. The sense transformer is so polarized at the time of manufacture that when the sense control knob 93 is depressed the intersection of the pointers will move to the right if the station is ahead. If the bearing is the reciprocal, or the station astern, the intersection of the pointers will move to the left. For satisfactory elimination of the 180° bearing ambiguity, the intersection of the pointers should always be on zero before the sense knob is pressed. This can be readily done by rotating the loops to a position where the pointer intersection occurs on the zero or unity ratio line and when depressing the balance control knob 85 it indicates the bearing to be either ahead or astern.

On manual volume control, with the station properly tuned in and adjusted to the proper meter level, rotating the loop off the zero bearing after properly balancing the two amplifiers, will cause one channel to receive more voltage than the other channel. This will be followed by a corresponding change in meter deflection. That is, one meter will receive more current than the other meter. As the amplifiers are linear, and the ratio of the voltages of the two loops is measured independently of the field strength that they may be in, the meter (which has been pre-calibrated) will indicate the angular position of the loops up to 45° to right or left of the direction of the incoming wave. The meter 35 shown in Figure 1 has its scale calibrated to 60°. This calibration has been found to correctly compensate for quadrantal error on large modern all-metal planes, such as the Douglas DC3.

Should it be desired to re-balance off the zero bearing position, merely pressing the control knob 85 will insure equal voltages being impressed upon the grids of mixers 18 and 18'. Using automatic volume control, it may seem at first hand that bearing errors would be introduced. This is not the case however, because the automatic volume control voltage produced as previously described is to all practical purposes independent of loop position and is common to both channels. Bearing errors due to automatic volume control only occur if the balance should change with change in gain. In practice, this has been found to be entirely negligible and furthermore can always be checked by depressing the control knob and re-balancing if necessary.

Figures 2 and 5 illustrate the construction of the dual sensitivity and balance control in greater detail.

The latter consists of a frame 100, on which is mounted the variable sensitivity control resistor 45 and the balance control resistor 70. The sensitivity control is fastened to the forward part of the frame by means of the nut 101, while the balance control is fastened to the rear of the frame by nut 102. Switch 103 which operates in conjunction with the clutch 88 constitutes the mechanical interlocking system shown schematically on Figure 1. Experience has shown it to be preferable to perform the interlocking function by means of electrical relays instead of the switches shown in Figure 1.

As can be seen, control knob 85 is fastened to the end of shaft 86 which passes through the hollow shaft 87 on which is fastened the single faced clutch 91. The spiral spring 104, mounted over the end of the balance control mounting bushing, holds clutch 88 tightly engaged with clutch 91. Rotation of knob 85, therefore, can only cause rotation of sensitivity control 45. However, when knob 85 is depressed as shown in Figure 3, clutch 88 engages clutch 92. Rotating knob 85 will now produce rotation of the balance control and the sensitivity control will stay fixed in position and exactly as previously adjusted. Mounted on the front end of the hollow shaft 87 is a pointer 45 which indicates the setting of the sensitivity control 45 regardless of the position of the balance control. In Figure 3 switch 103 is shown to be operated when the balance knob 85 has been depressed. Closing the switch 103 as shown in Figure 3 operates the balance switch 16, Figure 1, which, in this particular case is a relay. Figure 4 is an end view of the same combined control and together with the top view, Figure 5, shows the arrangement of the terminals 100.

Figures 6, 7, and 8 illustrate the streamlined housed coaxial loop structure more fully described hereinafter.

The coaxial loops 200 can best be seen by looking at Figure 6 where they are set for the zero degree or dead ahead bearing. The upper half of the loop shield 201 consists of an aluminum cast-ing fastened to the lower half 202 by means of four insulated screws shown at 203. Insulating spacers 204 prevent the upper and lower halves of the loop shield from coming into electrical contact and prevent a closed metallic circuit around the periphery of the loops. The upper half of the loop shield is held at ground potential by the metallic rod 205 which is tapped into both the upper and lower halves of the loop shield. The bottom half of the loop shield is fastened to the base plate 206 by means of the four screws 207. Screws 207 also fasten the base plate and loop structure to the revolving worm gear contained within housing 210. Part 211, shown by the dotted line in Figure 6, is a small housing cast integral with 210 and contains the worm. This worm housing can be seen to better advantage in Figure 8. The worm contained in housing 211 engages with the large gear indicated by the pitch line 212 to which the loop base is fastened. The worm which is not visible, in any of the figures, connects to the 90° angle drive 214 to which the flexible drive shaft 215 is connected. Therefore, when shaft 215 is rotated by any suitably geared and indexed control mechanism the motion is transmitted at right angles by the right angle drive 214 to the worm contained in housing 211 which engages with gear 212 and causes the loops to rotate together in either direction to the desired number of degrees.

As the loop structure rotates it carries with it the loop commutator not shown. The loop commutator is fastened to the large 212 gear by means of a flanged tube contained within the housing 210. This flanged tube cannot be seen in the drawings.

The loop commutator is made of a high grade low loss insulating material and mounted thereon are five coin silver slip rings. Five brush contactors 219 are carried on the housing 219. As shown in Figure 8, the two upper brush contactors connect to the loop plug connector 220. The two lower brush contactors which are shown dotted in Figure 8, connect to the loop plug connector 221 shown in Figure 7. Brush contactor 222 as seen in Figure 8 provides for a ground connection between the shields of coaxial loops 200 and housing 210. This ground brush is necessary because of the ball bearing upon which the flanged tube is mounted. Poor ground connections resulting in imperfect shielding have been experienced by reason of variation of the contact resistance of the ball bearing. By-passing the bearing with the ground brush as described, eliminates this difficulty when the loops are rotated.

Also mounted on housing 210 is the loop index contactors shown on 235. This consists of an insulated brush contactor similar to those shown at 219 and is provided for the purpose of making contacts with a ground terminal which is carried on the rotating loop. The purpose of this ground contactor is to provide an electrical connection and a remote visual indication for the pilot when the loop is properly set on zero for the dead ahead bearing. The schematic wiring diagram Figure 1 shows the electrical circuit. Switch 95 is the loop contactor which is placed in series with lamp 96 and battery 97. When the coaxial loops are within ½° either side of the zero bearing position, switch or contactor 95 closes and gives an indication on lamp 96 to the pilot.

Referring to Figure 7 it can be seen that the entire assembly consisting of the loop, 200, the drive housing 210 and loop commutator, is carried on the cast aluminum base of the streamlined housing 230, and is fastened to it by means of screws 236 as shown in Figure 8. Screws 237 fasten the lower half of the streamlined housing 238 which is of insulating material, to the base. Placed between the lower half 238 and the upper half 239 of the streamlined housing is an endless H section rubber gasket 240 to prevent the seepage of rain, etc.

The aluminum aligning posts 241 and 242 are made in two telescoping halves. The upper halves 241' and 242' fit over the lower halves, 241" and 242" as shown in Figure 7. The bolts 243 thread into the lower halves of the posts 241" and 242", and when tightened hold the housing rigidly together preventing warping at the edges.

Figure 9 illustrates the method of shielding and winding the coaxial loops. The broken lines 300 and 301 indicate the upper and lower halves respectively of the metallic loop shields shown on Figure 7 as 201 and 202. The insulating members shown on Figure 7 as 204 are shown on Figure 9 by the open spaces 302. The upper half of the shielding 300 and the lower half of the shielding 301 are electrically inter-connected by the vertical conductor shown schematically as 303. Grounding the upper half 300 to the lower half 301 at a single point in conjunction with the insulating spacers 302 eliminates the short circuiting effect closed paths around the peripheries of the loops would produce, and at the same time permits the upper shield 300 to act as an effective electrostatic shield, for the loop windings 304 and 305.

To be useful with the direction finding system described herein, the following special requirements must be met in designing the loop structure. First, no electrostatic or electromagnetic interaction can exist between the loop windings 304 and 305. This condition is secured by winding the loops so that they are coaxial and geometrically 90° apart, thus eliminating any possibility of magnetic coupling. Electrostatic coupling will be introduced at the area of cross over of the two loop windings and must be eliminated by the interposition of shield plates, preferably by flat shields 306 in the upper half and 307 in the lower half of the loop housing. These shield plates must only be grounded at one point otherwise circulating currents will occur and introduce magnetic coupling which otherwise does not exist. Second, equal loop areas must be maintained. This introduces the problem of loop windings crossing each other without affecting the equality between the areas enclosed by the windings 304 and 305.

Inspection of Figure 9 will show that the loop winding 305 is raised where it crosses the shield 306 by the same amount that loop winding 304 is depressed when it crosses under the shield 307.

Following through from terminal 310 of the loop winding 304 underneath the shield 307 in the direction of winding as indicated by the arrows the first turn of the winding is that which is placed nearer the inside portion of the shield as indicated by 315 on Figure 7. The inner turn or first layer of the winding is indicated at 316. Continuing around and under shield 306 and completing the turn by again passing under shield 307 the next layer is started. It should be noted that while two layers of winding are shown, that is to say, turn 316 and 317 represent different layers, that at the point where they pass under and over the shield 306 and 307 they become a single layer to provide space for the cross over. Continuing the turn 317 in the direction of the arrows under the shield 306 and ending under the shield 307 the loop winding is terminated in the terminal 309, the high potential terminal.

The second loop winding indicated by turns 318 and 319 is wound in the opposite direction from the loop 304. Starting at the low potential terminal 311, turn 318 is the lower layer or inner turn nearest the shielding wall indicated at 316 on Figure 7. Turn 318 likewise continues up to shield 306 but instead of passing under it passes over it and in the same horizontal plane with outer layer 319. Loop 305 indicated by winding 318 and 319, is wound exactly in the same fashion as the other loop except for the differences noted.

Shield 308 prevents electrostatic coupling from the loop leads as they are brought to the commutator mechanism shown in Figure 8.

A third requirement for the elimination of coupling between loops 305 and 304 is that the mean plane of windings 318—319 and 316—317 must intersect on the exact mechanical axis of the assembly. By winding one loop in a clockwise direction as indicated on Figure 9 the electrical centers of the loop system will agree with the mechanical center. It should be noted that if they are wound in the same direction that electromagnetic coupling will exist between the loops because it is impossible to have the mean planes of the loops exactly 90° apart.

Arrow 320 indicates the direction from which the incoming signal field must arrive for the loops voltages to add when the loops are serially connected.

The upper half of the shielding 300, the lower half 301 and the shields 306 and 307 which are placed at the cross over points of the two loop windings are all electrically interconnected and grounded.

Certain other operational features of the instrument have become apparent while flying, for example: When flying directly over the source of radiation it has been discovered that both pointers drop abruptly in the so called "cone of silence" zone. "Cone of silence" indication has always been difficult to obtain in the past, the particular difficulty being to tell when the aircraft is immediately over and not slightly to one side of the station. This instrument operates in an entirely different manner.

Should the aircraft not be exactly over the source of radiation but slightly to the right one pointer will drop before the other one does because one loop is on the zero signal position before the other loop. The reverse effect is obtained when the aircraft is slightly to the left of the correct position. Therefore, there is only one condition in which both pointers will drop together, and that is when exactly over the center of the source of radiation.

These improvements are the result of five years continuous development of the direction finding system disclosed in co-pending applications and of several thousand hours of actual flying in airline operation and of numerous installations in various types of aircraft.

It will be evident from the above that the invention is not limited to the specific details of construction and operation shown and disclosed herewith for illustration, but that the novel principles and concept of the invention are susceptible of numerous embodiments and modifications coming within the broad scope of the invention as defined in the appended claims. The specification and drawings are accordingly to be regarded in an illustrative and not in a limiting sense.

We claim:

1. In a radio direction finder comprising a pair of normally separate and differently oriented directional antennae, separate receiving and amplifying channels connected to the outputs of said antennae, a first control means for simultaneously and equally varying the sensitivities of both said channels in the same direction, a second control means for combining the energies aborbed by said antennae, means whereby equal amounts of the combined energy are applied to each of said channels, a third control means for differentially adjusting the sensitivities of said channels, and a common actuating member for independent operation of said first control means and for combined operation of said second and third control means.

2. In a radio direction finder comprising a pair of normally separate and differently oriented directional antennae, separate receiving and amplifying channels connected to said antennae, a common bearing indicator responsive to the relative input energies absorbed by said antennae from an incoming radio signal and connected to the outputs of both channels, a first control means for equally and simultaneously adjusting the sensitivities of both said channels in the same direction, a second control means for combining the energies absorbed by said antenna, means whereby the combined energy is applied in equal portions to both said channels, a third control means for differentially adjusting the output impedance of both channels, and a common actuating means for independent operation of said first control means and for combined operation of said second and third control means.

3. In a direction finder as claimed in claim 2 wherein said first control means is comprised of a common volume control for both channels and said third control means is comprised of a regulator including a pair of differentially adjustable output resistances in said channels, said actuating means comprising a control knob and a clutch member operatively connected therewith, said volume control, said regulator and said second control means, whereby rotation of said knob causes operation of said volume control and simultaneous axial displacement and rotation of said knob causes operation of said second control means and said regulator.

4. In a radio direction finder comprising a pair of normally separate and differently oriented directional antennae, separate receiving and amplifying channels connected to said antennae, output impedances in both channels, a common bearing indicator responsive to the relative energies absorbed by said antennae from an incoming radio signal and connected to the outputs of said channels, control means for temporarily connecting said antennae in series, means whereby equal portions of the combined energy in the series connection of said antennae are applied to said channels, further control means operatively combined with said first control means for simultaneously increasing the output impedance of one channel while decreasing the output impedance of the other channel with said first control means in the position where said antennae are connected in series, and further control means operatively combined with said first control means for simultaneously varying the sensitivities of both channels in the same direction with said first control means in the position where said antennae are separated.

5. In a radio direction finder comprising a pair of orthogonal concentric, electrostatically shielded loops, separate receiving and amplifying channels having equal overall sensitivities and connected to said loops, a common bearing indicator connected to the outputs of said channels, a non-directional antenna, and unitary control means for temporarily connecting said loops in series and simultaneously connecting said non-directional antenna to the midpoint of said serially connected loops.

6. In a radio direction finder comprising a pair of orthogonal concentric, electrostatically shielded loops, separate receiving and amplifying channels having equal overall sensitivities and connected to said loops, a common bearing indicator connected to the outputs of said channels, a non-directional antenna, unitary control means for temporarily connecting said loops in series and simultaneously connecting said non-directional antenna to the midpoint of said serially connected loops through an impedance matching transformer.

7. In a radio direction finder comprising a pair of differently oriented directional antennae, a twin channel receiver-amplifier connected to said antennae, a radio frequency output transformer in each channel, each of said transformers having a primary, a secondary and a tertiary winding, separate rectifiers connected to the secondary windings, a bearing indicator energized from the outputs of said rectifiers, additional rectifiers connected to said tertiary windings, and means for combining the rectified outputs in the tertiary winding circuits.

8. In a radio direction finder comprising a pair of differently oriented directional antennae, a twin channel receiver-amplifier connected to said antennae, a radio frequency output transformer in each channel, each of said transformers having a primary, a secondary and a tertiary winding, separate rectifiers connected to the secondary windings, a bearing indicator energized from the outputs of said rectifiers, additional rectifiers connected to said tertiary windings, means for combining the rectified outputs in the tertiary winding circuits, and an audio amplifier energized from the combined rectified output.

9. In a radio direction finder comprising a pair of differently oriented directional antennae, a twin channel receiver-amplifier connected to said antennae, a radio frequency output transformer in each channel, each of said transformers having a primary, a secondary and a tertiary winding, separate rectifiers connected to the secondary windings, a bearing indicator energized from the outputs of said rectifiers, additional rectifiers connected to said tertiary windings, means for combining the rectified outputs in the tertiary winding circuits, means for deriving a common volume control potential from the combined rectified output, and means for applying said volume control potential to equivalent gain control elements in both channels.

10. In a radio direction finder comprising a pair of differently oriented loops, a twin channel receiver-amplifier connected to said loops, a radio frequency output transformer in each channel of said receiver-amplifier, said transformers having primary, secondary and tertiary windings, rectifiers and high load resistances connected to the secondary windings of each transformer, additional rectifiers and low load resistances connected to each of the tertiary windings of said transformers, and means for utilizing said high load resistance rectifier circuits of both channels to develop both a direct current potential for automatic volume control and an audio frequency voltage for oral reception, and a bearing indicating instrument connected to said low load impedance rectifier circuits of both channels.

11. In a radio direction finder comprising a pair of differently oriented directional antennae, a twin channel receiver-amplifier connected to said antennae, a common bearing indicator connected to the outputs of said receiver-amplifier, a radio frequency output transformer in each channel having a primary, a secondary and a tertiary winding, each secondary winding of said transformers being connected to a common high load resistance rectifier output circuit and each tertiary winding of said transformers being connected to a separate low load resistance rectifier circuit.

12. In a radio direction finder comprising a pair of differently oriented directional antennae, separate receiving and amplifying channels having equal over-all sensitivities and connected to said antennae, each of said channels comprising radio frequency amplifying valves having main electrodes and at least one grid, a common bearing indicator responsive to the relative energies absorbed by said antennae from an incoming radio wave and connected to the outputs of said channels, means for rectifying and combining portions of the outputs of said channels, means for deriving a gain control potential from the combined rectified output, and further means for applying said gain control potential to at least one pair of corresponding grids in said channels for equally affecting the sensitivities of said channels with variations of the receiving field strength.

13. In a radio direction finding system comprising a pair of relatively fixed differently oriented loops for receiving a radio signal, separate amplifying channels including rectifiers of equal overall sensitivity connected to said loops, a crossed pointer bearing meter having two separate movements, one of said movements being energized from the rectified output supplied by one of said channels, and said other movement being energized from the rectified output supplied by the other channel, means for jointly rotating said loops to equalize the pointer deflections of said meter, an omni-directional antenna having an effective height of the same order of magnitude as said loops, common means for connecting said loops in series, and for simultaneously connecting said antenna to the midpoint of said series connected loops, whereby lateral movement of the intersection of said pointers resolves the sense of direction of said radio signal.

14. A system for receiving audio modulated radio frequency signals comprising a pair of coaxial electrostatically shielded loop antennae fixed at right angles to each other, separate receiving channels connected to said loops, each of said channels including radio frequency amplifying and rectifying means, means for measuring the relationship of the outputs of said rectifying means, a common audio amplifier controlled by the combined audio outputs of said rectifying means, and an audio signal translating device connected to the output of said audio amplifier.

15. In a radio direction finder comprising a plurality of directional antennae, separate amplifying channels connected to said antennae and a common bearing indicator having individual actuating elements of like sensitivity operatively connected to the outputs of each channel and responsive to the relative energies absorbed by said antennae from a received signal, means for adjusting simultaneously the relative sensitivity of said actuating elements so as to conform in exact inverse ratio to the degree of amplification of said signal in each channel.

16. In a radio direction finder comprising a plurality of directional antennae, separate amplifying channels connected to said antennae and a common bearing indicator having individual actuating elements of like sensitivity operatively connected to the outputs of each channel and responsive to the relative energies absorbed by said antennae from a received signal, means comprising variable impedances in circuit with each of said actuating elements for adjusting simultaneously the relative sensitivity of said actuating elements so as to conform in exact inverse ratio to the degree of amplification of said signal in each channel.

17. In a unilateral radio direction finder, a pair of similar directional antennae separate receiving and amplifying channels connected to each directional antenna, a common bearing indicator connected to the output of each channel and responsive to the relative energies absorbed by said antennae from a received signal, a nondirectional antenna having an effective height of approximately the same order as said directional antennae; means for simultaneously connecting said directional antennae in series and said non-directional antenna to the midpoint of said serially connected directional antennae whereby said bearing indicator will then indicate the sense of direction.

EMIL J. SIMON.
EDWARD J. HEFELE.